Figures 1, 2, 3:
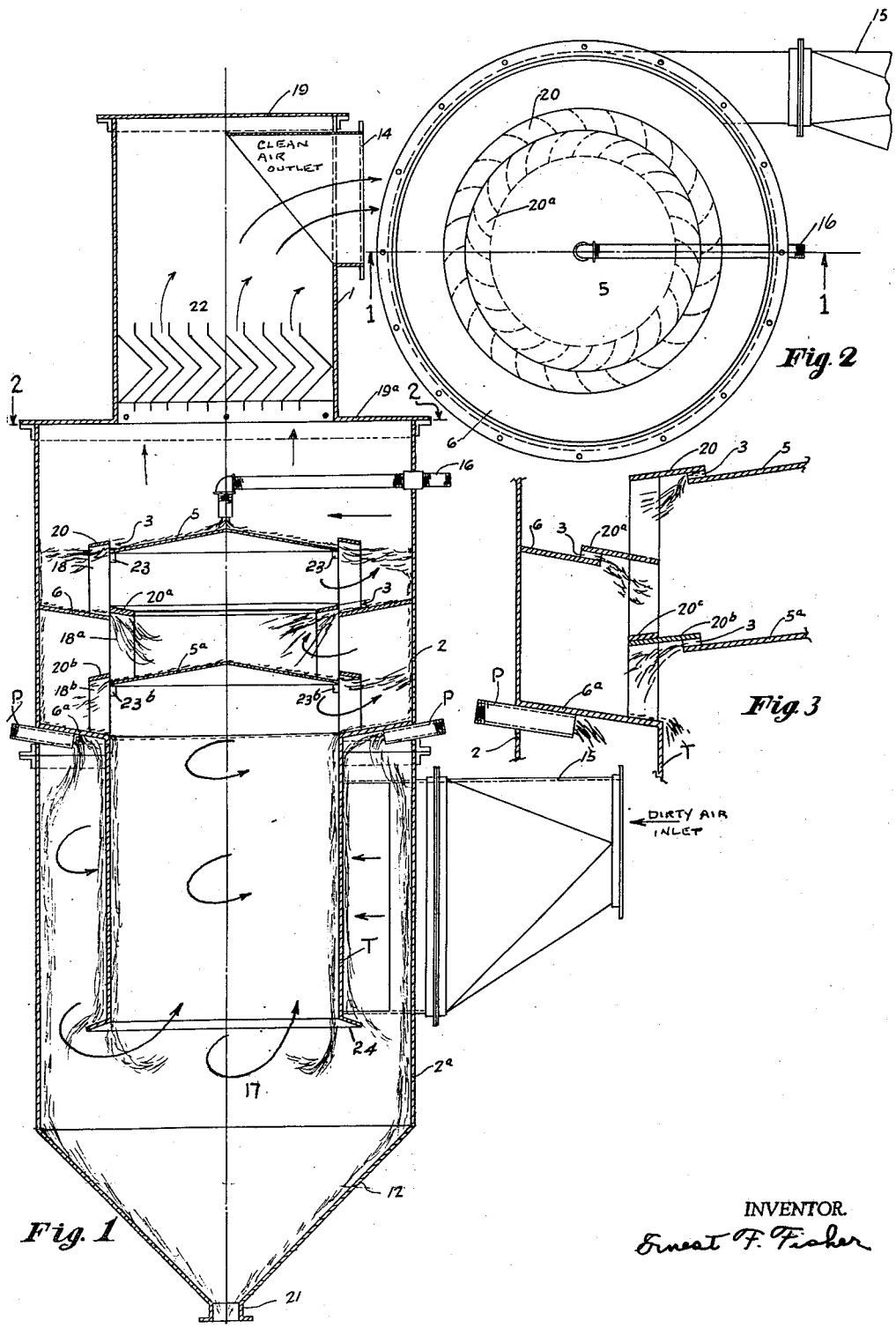

Oct. 14, 1941.  E. F. FISHER  2,259,033

LIQUID AND AIR CONTACT COLUMN FOR CLEANING AIR AND GASES

Filed Feb. 15, 1939

INVENTOR.
Ernest F. Fisher

Patented Oct. 14, 1941

2,259,033

UNITED STATES PATENT OFFICE 2,259,033

LIQUID AND AIR CONTACT COLUMN FOR CLEANING AIR AND GASES

Ernest F. Fisher, Boston, Mass.

Application February 15, 1939, Serial No. 256,522

9 Claims. (Cl. 261—79)

My invention, which is a continuation-in-part of my application Serial No. 250,101, filed January 10, 1939 relates to improvements in liquid and air contact columns wherein air or other gases are treated to remove solid particles of matter, the object being attained by subjecting air to be treated to the continuous scrubbing action of water or other liquid which is set in violent agitation by swirling air and caused to wet large surface areas upon which the solid particles are caused to impinge out of the air current thus leaving the air clean.

This invention consists in the novel features of construction more fully set forth in the specifications and pointed out in the claims.

The principal object of my invention is to provide a more preliminary wetting of the dust particles carried by the incoming air as it enters the unit and before the dust laden air receives its final contact with the liquid.

Another object of my invention is to more effectively wet the vanes through which the dust laden air swirls and against which the particles of dust impinge and to more effectively wet the walls of the enclosing chamber so that particles of dust that impinge thereon may be washed off and the surfaces kept clean and the dust washed down with the downcoming water or other liquid.

A further object of my invention is to provide a system of guide vanes, impingement plates, baffles and enclosing walls that imposes the least resistance to the flow of air as it swirls in a continuous path without change of direction.

Other advantages of my invention will be better apparent from a detailed description in connection with the accompanying drawing in which: Figure 1 is a vertical cross sectional elevation of the column taken on line 1—1 of Figure 2. Figure 2 is a plan section taken on the line 2—2 of Figure 1. Figure 3 is an enlarged detail section showing another construction I employ to permit the water to flow under the blade baffle ahead of the air and before the air impacts the blades so that the water will be better distributed over the blades.

Dust or fume laden air to be cleaned enters the tangential inlet 15 above the conical bottom 12. This inlet is tangent to the wall of axial tube T which forms with wall 2ª an annular space about or adjacent the inlet 15. As the air swirls around the annular space, water which falls into the annular space from pipes P, is thrown against the adjacent walls 2ª and wall of axial tube T against which the heavy dust impinges and is washed down into conical chamber 12, past the annular flange 24 which removes more particles by imparting an increased centrifugal force to them as they pass below it. The air with the remaining fine dust swirls in chamber 17 below axial tube T and thence upward through axial tube T. Due to the high angular velocity of the swirling air through tube T, much of the fine dust impinges because of centrifugal force, against the inner wall of tube T which is wetted by water from the baffle, or diaphragm, 6ª supplied by pipe 16 at the top of the column.

Continuing its spiral swirl the air with the remaining fine dust is guided outwardly toward the wall 2 by the curved vanes 18ᵇ carrying with it the water falling off the edge of liquid distributing baffle 5ª and wetting the vanes 18ᵇ and the adjacent wall 2. In the claims I will refer to this action by using the word "windward" to indicate the edge of the curved vane which is first contacted by the gas and water in its passage through the column. Fine dust that impinges on these wetted surfaces is washed down by the downcoming water. Continuing its swirl the air is next guided inwardly by the curved blades 18ª above and carries with it the water falling off of the edge of baffle, or diaphragm, 6 wetting the vanes 18ᵇ and then falling on to liquid distributing baffle 5ª. More fine dust impinges on these wetted surfaces. Further swirling of the upwardly rising air brings it to vanes 18 which guide it outwardly again which action assists in wetting blades 18 and adjacent wall 2. The fine dust that impinges on all these surfaces and that is eliminated from the air stream by the scrubbing action of the water, is washed down into sludge chamber 12 and thence drains out through outlet 21.

The clean air passes upward through spray eliminating plates 22 where any solid particles of water impinge and drop down into chamber therebelow, thence to suction fan not shown but connected with outlet 14 of chamber 1 which forms with cover 19ª the top of chamber 2. If it is desired, clean water can be circulated through the supply pipe 16 and thus the cleaned air is uncontaminated. The water that is used in supply pipes P may be the dirty or contaminated water that has been separated from the sludge. Thus it is to be noted that there are two separate liquid supply means 16 and P.

The vertical clearances 3 between the ring baffles 20, 20ª and 20ᵇ are just sufficient to permit the sheets of water falling from edges of liquid distributing baffle 5, ring baffle 6, liquid distributing baffle 5ª and ring baffle 6ª to flow therebetween and to effectually seal this clearance so no air will bypass therethrough.

With the construction as shown, the liquid distributing baffle 5ª with its curved vanes 18ª and the liquid distributing baffle 5 can be assembled easily as they fit inside the ring baffles 20 and 20ᵇ and curved vanes 18 and 18ᵇ. They are held in place by stops shown at 23 and 23ᵇ or by tack welding to adjacent blades.

The liquid distributing baffle together with the corresponding baffle which supports the adjacent swirl-producing vanes may also be considered as a unitary structure or disc baffle assembly.

Having now particularly described my invention and its manner of operation, I declare that what I claim is:

1. A gas cleaning apparatus comprising a column provided with a tangential inlet for gases to be cleaned at the bottom and an outlet for cleaned gases at the top, a substantially horizontal diaphragm provided with a central opening attached to the inner wall of the column between said inlet and said outlet, a substantially horizontal baffle means provided with a central opening spaced from the column supported above said diaphragm, a plurality of circularly disposed vertical whirl-producing vanes spaced from the column extending between said diaphragm and said baffle means, a substantially horizontal imperforate liquid distributing plate disposed to close said central opening to the flow of gas while permitting the distribution of washing liquid to said opening supported so that its outer edge lies just below the inner edge of said baffle means and above said diaphragm, and means to supply liquid to said distributing means.

2. Apparatus as in claim 1 in which the baffle means overlaps the distributing plate.

3. A gas cleaning apparatus comprising a column provided with a tangential inlet for gases to be cleaned at the bottom and an outlet for cleaned gases at the top, a substantially horizontal diaphragm provided with a central opening attached to the inner wall of the column between said inlet and said outlet, a baffle means provided with a central opening spaced from the column supported with its outer edge above the inner edge of said diaphragm, a substantially horizontal imperforate liquid distributing plate disposed to close said central opening to the flow of gas while permitting the distribution of washing liquid to said opening supported closely below said baffle means, a plurality of circularly disposed vertical whirl-producing vanes spaced from the column extending between said baffle means and said diaphragm, and means to supply liquid to said plate.

4. Apparatus as in claim 3 in which said baffle means overlaps said diaphragm.

5. A gas and liquid contact apparatus comprising in combination a cylindrical casing provided with a tangential inlet for gases to be cleaned at the bottom and an outlet for cleaned gases at the top, a substantially horizontal ring baffle attached at its outer edge to the inner wall of the casing between said inlet and said outlet, a substantially horizontal disc baffle assembly spaced from the casing supported above said ring baffle, a plurality of whirl-producing vanes extending between said disc baffle assembly and said ring baffle, means for supplying liquid to the upper surface of said disc baffle assembly, and an opening provided in said disc baffle assembly contiguous to the inner edges of said vanes so arranged that portions of said liquid flow therethrough and copiously wet the surfaces of said vanes.

6. Apparatus as in claim 5, in which a substantially vertical tube, spaced from said casing, is dependent from said ring baffle.

7. A gas and liquid contact apparatus comprising in combination a cylindrical casing provided with a tangential inlet for gases to be cleaned at the bottom and an outlet for cleaned gases at the top, a substantially horizontal ring baffle attached at its outer edge to the inner wall of the casing between said inlet and said outlet, a substantially horizontal disc baffle assembly spaced from the casing supported above said ring baffle, another substantially horizontal disc baffle assembly spaced from the casing supported below said ring baffle, a plurality of circularly disposed whirl-producing vanes extending between said ring baffle and the disc baffle assembly above it, a plurality of circularly disposed whirl-producing vanes extending between said ring baffle and said disc baffle assembly below it, means to supply liquid to the upper surface of the upper disc baffle assembly, an opening provided in the surface of said upper disc baffle assembly, contiguous to the inner edges of the first group of vanes, an opening provided in the surface of said ring baffle, contiguous to the outer edges of the second group of vanes, both of said openings being so arranged that portions of said liquid drain through said openings and copiously wet the surfaces of said vanes.

8. A gas and liquid contact apparatus comprising in combination a cylindrical casing provided with a tangential inlet for gases to be cleaned at the bottom and an outlet for cleaned gases at the top, a substantially horizontal disc baffle assembly spaced from the casing supported between said inlet and said outlet, a substantially horizontal ring baffle attached at its outer edge to the inner wall of the casing above said disc baffle assembly, a substantially horizontal ring baffle attached at its outer edge to the inner wall of the casing below said disc baffle assembly, a plurality of circularly disposed whirl-producing vanes extending between said disc baffle assembly and said ring baffle above it, a plurality of circularly disposed whirl-producing vanes extending between said disc baffle assembly and said ring baffle below it, means to supply liquid to the upper surface of the upper ring baffle, an opening provided in the surface of said upper ring baffle contiguous to the outer edges of the first group of vanes, an opening provided in the surface of said disc baffle assembly contiguous to the inner edges of the second group of vanes, both of said openings being so arranged that portions of said liquid flow through said openings, thereby copiously wetting the surface of said vanes.

9. Apparatus as in claim 8, in which a substantially vertical tube spaced from the casing is dependent from the lower ring baffle.

ERNEST F. FISHER.